(12) United States Patent
Lummerstorfer et al.

(10) Patent No.: US 11,530,320 B2
(45) Date of Patent: Dec. 20, 2022

(54) LONG CARBON FIBRE REINFORCED POLYPROPYLENE COMPOSITION

(71) Applicant: BOREALIS AG, Vienna (AT)

(72) Inventors: Thomas Lummerstorfer, Linz (AT); Wolfgang Stockreiter, Linz (AT); Michael Jerabek, Linz (AT); Stefan Hochradl, Linz (AT); Michael Tranninger, Linz (AT)

(73) Assignee: BOREALIS AG, Vienna (AT)

( * ) Notice: Subject to any disclaimer, the term of this patent is extended or adjusted under 35 U.S.C. 154(b) by 353 days.

(21) Appl. No.: 16/630,254

(22) PCT Filed: Jul. 26, 2018

(86) PCT No.: PCT/EP2018/070301
§ 371 (c)(1),
(2) Date: Jan. 10, 2020

(87) PCT Pub. No.: WO2019/020751
PCT Pub. Date: Jan. 31, 2019

(65) Prior Publication Data
US 2021/0122905 A1   Apr. 29, 2021

(30) Foreign Application Priority Data

Jul. 28, 2017 (EP) ..................... 17183650

(51) Int. Cl.
| | | |
|---|---|---|
| C08L 23/12 | (2006.01) | |
| C08K 7/04 | (2006.01) | |
| C08K 3/04 | (2006.01) | |
| B29C 70/52 | (2006.01) | |
| B29C 45/00 | (2006.01) | |
| C08J 5/04 | (2006.01) | |
| B29K 23/00 | (2006.01) | |
| B29C 70/00 | (2006.01) | |
| B29C 70/06 | (2006.01) | |

(52) U.S. Cl.
CPC .......... *C08L 23/12* (2013.01); *B29C 45/0001* (2013.01); *C08J 5/042* (2013.01); *C08K 3/04* (2013.01); *C08K 7/04* (2013.01); *B29C 70/0035* (2021.05); *B29C 70/06* (2013.01); *B29C 70/52* (2013.01); *B29K 2023/12* (2013.01); *C08J 2323/12* (2013.01); *C08L 2205/08* (2013.01); *C08L 2205/16* (2013.01); *C08L 2207/02* (2013.01)

(58) Field of Classification Search
CPC .......... C08L 23/10; C08L 23/12; C08L 23/14; C08L 23/16; C08L 2207/02; C08K 3/04; C08K 7/04; B29C 70/52; B29C 70/06; B29C 70/003
See application file for complete search history.

(56) References Cited

U.S. PATENT DOCUMENTS

| | | | |
|---|---|---|---|
| 4,937,028 A | 6/1990 | Glemet et al. | |
| 10,717,832 B2 * | 7/2020 | Boragno | C08K 7/06 |
| 10,752,762 B2 * | 8/2020 | Lummerstorfer | C08L 23/12 |
| 2011/0178229 A1 | 7/2011 | Goda et al. | |
| 2016/0083873 A1 * | 3/2016 | Kawabe | D02J 1/20 28/283 |
| 2018/0257262 A1 * | 9/2018 | Katayama | C08L 23/12 |
| 2020/0017671 A1 * | 1/2020 | Lummerstorfer | C08L 33/24 |
| 2021/0340356 A1 * | 11/2021 | Katayama | C08K 5/523 |

FOREIGN PATENT DOCUMENTS

| | | | |
|---|---|---|---|
| CN | 101190982 A | 6/2008 | |
| CN | 102439085 A | 5/2012 | |
| CN | 104822736 A | 8/2015 | |
| EP | 1364760 A1 | 11/2003 | |
| EP | 2233506 A1 | 9/2010 | |
| EP | 2256150 A1 | 12/2010 | |
| EP | 2692794 A1 | 2/2014 | |
| EP | 2803693 A1 | 11/2014 | |
| EP | 3081591 A1 | 10/2016 | |
| EP | 3095818 A1 | 11/2016 | |
| EP | 3095819 A1 | 11/2016 | |
| EP | 3095820 A1 | 11/2016 | |
| JP | 1-317751 A | 12/1998 | |
| JP | 2006-272773 A * | 10/2006 | B29B 13/02 |
| JP | 2006-291039 A | 10/2006 | |
| JP | 2010-027279 A | 2/2010 | |
| JP | 2013-177560 A | 9/2013 | |
| JP | 2017-8242 A | 1/2017 | |
| JP | 2017-65058 A | 4/2017 | |
| KR | 10-2011-0089265 A | 8/2011 | |
| KR | 10-2014-0018292 A | 2/2014 | |
| WO | 2012/132764 A1 | 10/2012 | |
| WO | 2016/057734 A1 | 4/2016 | |

(Continued)

OTHER PUBLICATIONS

JP 2006-272773 A (Oct. 12, 2006) Katayama, Masahiro; machine translation. (Year: 2006).*
Indian Office Action for Application No. 201917051063 dated Aug. 18, 2020.
Korean Office Action dated Nov. 16, 2020.
Japanese Office Action dated Dec. 15, 2020.
Applicant: Borealis AG; "Long Carbon Fibre Reinforced Polypropylene Composition"; Chinese Patent Application No. 201880045780.8; Chinese Office Action dated Nov. 29, 2021; 15 pgs.

(Continued)

*Primary Examiner* — Rip A Lee
(74) *Attorney, Agent, or Firm* — Tarolli, Sundheim, Covell & Tummino LLP

(57) ABSTRACT

Polypropylene composition comprising a polypropylene base material, a carbon fibre and an adhesion promoter with an excellent impact/stiffness balance, its preparation, articles comprising the composition and the use of the composition.

13 Claims, No Drawings

(56) References Cited

FOREIGN PATENT DOCUMENTS

WO     WO 2016/188886 A1 * 12/2016 .............. C08L 23/12

OTHER PUBLICATIONS

Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.

H. N. Cheng, et al., "13C NMR Analysis of Ethylene-Propylene Rubbers", Macromolecules 1984, 17, 1950-1955.

Kakugo, et al., "13C NMR Determination of Monomer Sequence Distribution in Ethylene-Propylene Copolymers Prepared with δ-TiC13—A1($C_2H_5$%)C1", Macromolecules 1982, 15, 1150-1152.

Resconi, et al., "Selectivity in Propene Polymerization with Metallocene Catalysts", Chem. Rev. 2000, 100, 1253-1345.

Wang, et al., "Structural Analysis of Ethylene/Propylene Copolymers Synthesized with a Constrained Geometry Catalyst", Macromolecules 2000, 33, 1157-1162.

Zhou, et al., "A new decoupling method for accurate quantification of polyethylene copolymer composition and triad sequence distribution with 13C NMR", Journal of Magnetic Resonance 187 (2007) 225-233.

Applicant: Borealis AG; Brazilian Patent Application No. BR112019024312; Filed Jul. 26, 2018; Brazilian Written Opinion; dated Jul. 13, 2022; 6 pgs.

* cited by examiner

LONG CARBON FIBRE REINFORCED POLYPROPYLENE COMPOSITION

The present invention relates to a new carbon fibre reinforced polypropylene composition with excellent impact/stiffness balance as well as to its preparation, articles comprising the composition and the use of the composition.

Reinforced polypropylene composites are well known and are quite often applied in the automobile industry where high requirements with regard to light-weight and at the same time good mechanical properties are to be fulfilled. Different fibres have been tried and used in these composites but especially polypropylenes reinforced with carbon fibres offer both low density and good stiffness and strength and thus are often the material of choice. Compared to alternative materials such as e.g. glass fibre reinforced polypropylenes it is mainly the excellent strength-to-weight ratio of carbon fibre materials that is advantageous.

However a common problem of the known carbon fibre reinforced compositions is that during any melt processing such as e.g. an injection moulding step applied for producing the final e.g. automotive article, fibre attrition to a certain extent cannot be controlled and cannot be avoided. As a consequence of this known materials show very complex structure—property—processing correlations and above all a low impact strength which limits their application areas. A known option to improve impact strength of the fibre reinforced polypropylenes is the addition of substantial amounts of elastomers but stiffness and strength are deteriorated at the same time.

EP 3095819 discloses a low density carbon fibre reinforced polymer composition comprising a polypropylene, carbon fibres and a polar modified polypropylene as coupling agent. For the production of the compositions the carbon fibres are used in the form of a non-woven fabric with the length of the carbon fibres used for producing the fibre reinforced polymer composition being in the range of 1.5 to 200 mm. However the document is completely silent about the length of the carbon fibres in the final polypropylene composition. Both the strength and impact performances of the disclosed materials are poor.

EP 3095818 discloses polypropylene carbon fibre composites comprising a polypropylene, carbon fibres, a polar modified polypropylene as coupling agent and additionally an elastomeric copolymer (ECP) comprising units derived from ethylene and C4 to C8 α-olefins. Tensile properties of polypropylene carbon fibre composites containing 10 wt % of elastomer are moderate and values for impact strength (unnotched) are not disclosed. The length of the carbon fibres in the polypropylene composites is neither disclosed.

From EP 3095820 fibre reinforced polymer compositions comprising a polypropylene, carbon fibres, a polar modified polypropylene as coupling agent and fibres other than carbon fibres are known. The document does not disclose the length of the carbon fibres in the reinforced polymer composition but only discloses the length of the carbon fibres used for producing the composition as being in the range of 1.5 to 200 mm. Stiffness properties of a propylene polymer composition containing 20.17 wt % carbon fibres and 10.2 wt % glass fibres are good, but impact performance is low.

From WO2016057734 a hybrid long fibre thermoplastic material is known, which comprises a hybrid assembled roving impregnated with a thermoplastic base material. The hybrid assembled roving includes a plurality of reinforcement fibres such as glass fibres and a plurality of carbon fibres comingled with the reinforcement fibres in the presence of a compatibilizer. In order to ensure excellent wetting and adhesion between the fibres and the matrix resin, the compatibilizer is needed. The final thermoplastic material combines the desired properties of both glass and carbon fibres. However as glass fibres are of higher density than carbon fibres, the final articles are of heavier weight than articles containing only carbon fibres as reinforcing material.

Accordingly, although much development work has been done in the field of carbon fibre reinforced polypropylene compositions, there still remains the need for light-weight materials which provide excellent stiffness and strength and at the same time increased energy absorption, i.e. impact strength and puncture energy.

The finding of the present invention is to use a particulate carbon fibre reinforced polypropylene composition comprising long carbon fibres whose average fibre length is equal to the particle length of the composition.

Accordingly the present invention is directed to a polypropylene composition comprising
a. 37.0 to 95.0 wt %, based on the total weight of the composition, of a polypropylene base material (PBM) wherein the polypropylene base material (PBM) is
  i. a propylene homopolymer (hPP) and/or
  ii. a propylene copolymer (cPP); and
b. 4.5 to 50.0 wt %, based on the total weight of the composition, of a carbon fibre (CF); and
c. 0.5 to 13.0 wt %, based on the total weight of the composition, of an adhesion promoter (AP), wherein the carbon fibre (CF) comprised in the composition is in the form of a roving and has an average fibre length in the range of 4.0 to 17.0 mm, the composition being present in the form of particles with the components a) and c) forming the polymer matrix (PM) having a melt flow rate $MFR_2$ (230° C., 2.16 kg) measured according to ISO 1133 in the range of 12.0 to 250.0 g/10 min and wherein the average particle length of the composition corresponds to the average fibre length of the carbon fibre (CF).

As the defined polypropylene composition provides good stiffness, strength as well as excellent impact strength and puncture energy and moreover is of low density it is possible to use it for manifold applications for instance in the automotive area.

The invention is now defined in more detail.

Polypropylene Composition

The claimed polypropylene composition must comprise a polypropylene base material (PBM), a carbon fibre (CF) and an adhesion promoter (AP). According to the invention the propylene base material (PBM) is a propylene homopolymer (hPP) or a propylene copolymer (cPP) or contains both a polypropylene homopolymer (hPP) and a propylene copolymer (cPP). Within the meaning of the present invention the term "propylene copolymer" covers propylene random copolymers, heterophasic copolymers and mixtures thereof. The polypropylene base material (PBM) and the adhesion promoter (AP) form the polymer matrix (PM), that is a continuous polymer phase in which the carbon fibres (CF) are dispersed.

Preferably the polypropylene composition of the invention is comprising 45.0 to 90.0 wt %, based on the total weight of the composition, of a polypropylene base material (PBM), 9.5 to 45 wt %, based on the total weight of the composition, of a carbon fibre (CF) and 0.5 to 10.0 wt %, based on the total weight of the composition, of an adhesion promoter (AP).

It is possible that both a propylene homopolymer (hPP) and a propylene copolymer (cPP) are present in the polypropylene base material (PBM).

An embodiment where the propylene base material (PBM) comprises only a propylene homopolymer (hPP) but does not comprise a propylene copolymer (cPP) is preferred.

Equally preferred is an embodiment where the propylene homopolymer (hPP) is the only polymer of the polypropylene base material (PBM) and where the propylene homopolymer (hPP) has a melting temperature measured according to ISO 11357-3 of at least 150° C., preferably in the range of 160° C. to 170° C. and/or a xylene cold soluble (XCS) content of ≤4.0 wt %, preferably in the range of 0.1 to 4.0 wt %, based on the total weight of the propylene homopolymer (hPP) and wherein the polymer matrix (PM) formed of components a) and c) has a melt flow rate $MFR_2$ (230° C., 2.16 kg) in the range of 12.0 to 250.0 g/10 min, preferably in the range of 12.0 to 200.0 g/10 min and even more preferably in the range of 14.0 to 150 g/10 min.

An embodiment where the heterophasic propylene copolymer (HECO) is the only polymer of the propylene base material (PBM) and where the heterophasic propylene copolymer (HECO) has a xylene cold soluble (XCS) content of >5.0 wt %, preferably in the range of 15.0 to 50.0 wt %, based on the total weight of the heterophasic propylene copolymer (HECO), and/or a comonomer content of ≤30.0 mol %, based on the total weight of the heterophasic propylene copolymer (HECO) and wherein the polymer matrix (PM) formed of components a) and c) has a melt flow rate $MFR_2$ (230° C., 2.16 kg) in the range of 12.0 to 250.0 g/10 min, preferably in the range of 12.0 to 200 g/10 min and even more preferably in the range of 14.0 to 150 g/10 min is also advantageous.

Likewise preferred is an embodiment wherein both a propylene homopolymer (hPP) and a heterophasic propylene copolymer (HECO) are comprised in the polypropylene base material (PBM) and wherein the propylene homopolymer (hPP) and heterophasic propylene copolymer (HECO) fulfil the above characteristics regarding the melting temperature and/or the xylene cold soluble (XCS) content and the $MFR_2$ (230° C., 2.16 kg) value respectively the xylene cold soluble (XCS) content and/or the comonomer content and the $MFR_2$ (230° C., 2.16 kg) value.

Especially preferred is an embodiment where the weight ratio of the propylene homopolymer (hPP) to the heterophasic propylene copolymer (HECO) in the polypropylene base material (PBM) is in the range of 1:5 to 1:25, even more preferred in the range of 1:7 to 1:20.

In yet another embodiment the polypropylene base material (PBM) is a propylene homopolymer (hPP) and the content of the carbon fibre (CF), based on the total weight of the composition, is in the range of 4.5 to 25.0 wt %, preferably in the range of 10 to 20 wt %.

It is preferred for the polypropylene composition according to the invention that the polypropylene base material (PBM) and the adhesion promoter (AP) are the only polymeric compounds in the composition. In particular the polypropylene composition of the present invention is free of elastomers, such as for example elastomeric copolymers (ECP) comprising units derived from ethylene and C4 to C8 α-olefins other than those eventually present in the polypropylene base material (PBM).

Preferably the carbon fibre (CF) is the only fibre contained in the polypropylene composition of the present invention. It is especially preferred that the polypropylene composition is free of fibers being selected from the group comprising glass fibers, metal fibers, mineral fibers, ceramic fibres and mixtures thereof.

The polypropylene composition further to the polypropylene base material (PBM), the carbon fibre (CF) and the adhesion promoter (AP) may contain typical additives and/or colours and/or alpha nucleating agents. The additives and/or colours and/or alpha nucleating agents can be used in amounts usual in the art such as for example up to 20 wt %, based on the total weight of the polypropylene composition. It is appreciated that the overall sum of components (a) polypropylene base material (PBM), (b) carbon fibre (CF), (c) adhesion promoter (AP) and additives and/or colours and/or alpha nucleating agents is 100.0 wt %.

As explained above the polypropylene base material (PBM) and the adhesion promoter (AP) contained in the polypropylene composition according to the invention form the polymer matrix (PM), that is a continuous polymer phase in which the carbon fibre (CF) is dispersed. As the carbon fibre (CF) in the composition is in the form of a roving the individual fibres (contained in the roving) are typically arranged parallel in the composition particles and preferably all fibres are of the same length.

The composition particles are preferably elongated particles, meaning that the dimension of the particles in longitudinal direction is larger than the dimension of the particles in cross direction. Typically the particles are of cylindrical shape. However any other shape than a cylindrical or longitudinal shape of the particles is also possible.

As the carbon fibres (CF) are present in the form of a roving, the individual fibres are parallel to each other. In the case of longitudinal such as for example cylindrical shape of the particles it is appreciated that the fibres are parallel to the longitudinal axis, e.g. to the cylindrical surface of the composition particles and it is preferred that—in a cross sectional view—the composition has a two layer structure, such as a core sheath structure with the carbon fibre (CF) roving forming the inner core which is covered by an outer layer comprising at least a part of the polypropylene base material (PBM). The above mentioned polymer matrix (PM) is the continuous polymer phase comprising the polypropylene base material (PBM) and the adhesion promoter (AP). The polymer matrix (PM) may thus be present both in the inner carbon fibre (CF) containing core between the individual fibres which form the roving and in the outer sheath around the carbon fibre (CF) containing core. The concentration of the adhesion promoter (AP) in the polymer matrix (PM) may vary over the diameter of the polypropylene composition particle.

Such a core sheath structure is obtained for example by a pultrusion process where an endless carbon fibre (CF) roving is combined with the polypropylene base material (PBM) and the adhesion promoter (AP) whereupon the thus obtained strands of the polypropylene composition are cut into specific lengths in order to receive the composition particles. The process for producing the polypropylene composition of the present invention will be explained in more detail below.

According to the invention the carbon fibre (CF) comprised in the polypropylene composition has an average fibre length in the range of 4.0 to 17.0 mm and the average particle length of the composition corresponds to the average fibre length of the carbon fibre (CF). Accordingly the average particle length of the composition is in the same range as defined above. The carbon fibres (CF) in the present invention are long carbon fibres (CF) in contrast to short carbon fibres (CF) in the known carbon fibre filled polypropylene materials where the fibres typically have lengths in the range of up to 30 μm.

It has been found that the mechanical properties such as in particular the impact strength of an article obtained by subjecting the polypropylene composition to an injection moulding step under pre-defined conditions is improved when the carbon fibre (CF) length in the composition is in the range as defined in the present invention.

The instant fibre-reinforced polypropylene composition enables the production of articles with exceptional mechanical properties such as increased stiffness and strength and impact behaviour at low density, especially compared to short carbon fibre filled materials as will be shown below in the example section.

Polypropylene Base Material (PBM)

According to the invention the polypropylene composition must contain a polypropylene base material (PBM) which is a propylene homopolymer (hPP) or a propylene copolymer (cPP). It is also possible that both a propylene homopolymer (hPP) and a propylene copolymer (cPP) are present in the polypropylene base material (PBM). Within the meaning of the present invention the term "propylene copolymer" covers propylene random copolymers, heterophasic copolymers and mixtures thereof.

It is preferred that the polypropylene base material (PBM) has a melt flow rate $MFR_2$ (230° C., 2.16 kg) measured according to ISO 1133 in the range of 12.0 to 250 g/10 min and preferably in the range of 14.0 to 150 g/10 min.

Moreover it is possible that only one type of a propylene homopolymer (hPP) and/or of a propylene copolymer (cPP) is present or that different types of propylene homopolymers (hPP) and/or propylene copolymers (cPP) are present in the polypropylene base material (PBM). Thus the base material may comprise more than one component (i) and/or more than one component (ii). In such cases where different types of propylene homopolymers (hPP) and/or propylene copolymers (cPP) are present, the amount in wt % of the polypropylene base material (PBM) refers to the total amount of all types of propylene homopolymers (hPP) and/or propylene copolymers (cPP).

In one embodiment the propylene homopolymer (hPP) has a melting temperature measured according to ISO 11357-3 of at least 150° C., preferably in the range of 160° C. to 170° C. and/or a xylene cold soluble (XCS) content of ≤4.0 wt %, preferably in the range of 0.1 to 4.0 wt %, based on the total weight of the propylene homopolymer (hPP) and wherein the polymer matrix (PM) formed of components a) and c) has a melt flow rate $MFR_2$ (230° C., 2.16 kg) in the range of 12.0 to 250 g/10 min and preferably in the range of 14.0 to 150 g/10 min. In the case that more than one type of propylene homopolymer (hPP) is present all the different types fulfil the above characteristics but at the same time differ from the other types of homopolymers (hPP) with regard to at least one of those characteristics.

In another embodiment the propylene copolymer (cPP) is a heterophasic propylene copolymer (HECO) having a xylene cold soluble (XCS) content of >5.0 wt %, preferably in the range of 15.0 to 50.0 wt %, based on the total weight of the heterophasic propylene copolymer (HECO), and/or a comonomer content of ≤30.0 mol %, based on the total weight of the heterophasic propylene copolymer (HECO) and wherein the polymer matrix (PM) formed of components a) and c) has a melt flow rate $MFR_2$ (230° C., 2.16 kg) in the range of 12.0 to 250 g/10 min and preferably in the range of 14.0 to 150 g/10 min. In the case that more than one type of heterophasic propylene copolymer (HECO) is present all the different types fulfil the above characteristics but at the same time differ from the other types of heterophasic propylene copolymers (HECO) with regard to at least one of those characteristics.

The expression propylene homopolymer (hPP) within the meaning of the instant invention relates to a polypropylene that consists substantially, i.e. of more than 99.5 wt %, still more preferably of at least 99.7 wt %, like of at least 99.8 wt %, of propylene units. In a preferred embodiment only propylene units in the propylene homopolymer (hPP) are detectable.

Within the meaning of the instant invention the terms propylene homopolymer, hPP and PP Homo (used in the examples section) denote the same, i.e. are interchangeable.

The propylene homopolymer (hPP) preferably features a low amount of xylene cold solubles (XCS), i.e. of ≤4.0 wt %, preferably in the range of 0.1 to 4.0 wt %, more preferably in the range of 0.1 to 3.0 wt % and most preferably in the range of 0.1 to 2.5 wt %.

The propylene homopolymer (hPP) is state of the art and commercially available.

Additionally or alternatively, the polypropylene base material (PBM) may comprise a propylene copolymer (cPP). The term "propylene copolymer (cPP)" covers random propylene copolymers as well as complex structures, like heterophasic systems.

The term "random propylene copolymer" denotes a copolymer of propylene monomer units and comonomer units, in which the comonomer units are randomly distributed in the polymeric chain. Thus, a random copolymer is different from a heterophasic copolymer comprising a matrix phase and an elastomeric phase dispersed therein, as described in detail below. Accordingly, the random propylene copolymer does not contain an elastomeric polymer phase dispersed therein, i.e. is monophasic and has just one glass transition temperature. However, the random propylene copolymer can be the matrix phase of a heterophasic propylene copolymer (HECO). The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Thus, the random propylene copolymer preferably comprises, preferably consist of, units derived from
(i) propylene and
(ii) ethylene and/or at least one C4 to C20 α-olefin, preferably at least one α-olefin selected from the group consisting of ethylene, 1-butene, 1-pentene, 1-hexene and 1-octene, more preferably ethylene and/or 1-butene, yet more preferably ethylene.

Additionally, it is appreciated that the random propylene copolymer has a melting temperature Tm of at least 130° C., preferably in the range of 130 to 160° C., more preferably in the range of 135 to 158° C., like in the range of 140 to 155° C.

As known for the skilled person, a random propylene copolymer is different from a heterophasic propylene copolymer (HECO) which is a propylene copolymer comprising a propylene homo or random copolymer matrix component and an elastomeric copolymer component of propylene with one or more of ethylene and C4-C8 alpha-olefin copolymers, wherein the elastomeric (amorphous) copolymer component is dispersed in said propylene homo or random copolymer matrix polymer.

The expression "heterophasic" indicates that the elastomeric copolymer is preferably (finely) dispersed at least in the polypropylene matrix of the heterophasic propylene copolymer. In other words the elastomeric copolymer forms inclusions in the polypropylene matrix. Thus, the polypropylene matrix contains (finely) dispersed inclusions being not part of the matrix and said inclusions contain the elastomeric copolymer. The term "inclusion" according to this invention shall preferably indicate that the matrix and the inclusion form different phases within the heterophasic propylene copolymer, said inclusions are for instance visible by high resolution microscopy, like electron microscopy or scanning force microscopy.

Within the meaning of the instant invention the terms heterophasic propylene copolymer, HECO and PP Heco (used in the examples section) denote the same, i.e. are interchangeable.

Furthermore, the heterophasic propylene copolymer (HECO) preferably comprises as polymer components only the polypropylene matrix and the elastomeric copolymer. In other words the heterophasic propylene copolymer (HECO) may contain further additives but no other polymer in an amount exceeding 5 wt %, more preferably exceeding 3 wt %, like exceeding 1 wt %, based on the total heterophasic propylene copolymer (HECO). One additional polymer which may be present in such low amounts is a polyethylene which is a reaction product obtained by the preparation of the heterophasic propylene copolymer (HECO).

The elastomeric copolymer is preferably an elastomeric propylene copolymer. The polypropylene matrix can be a propylene homopolymer (hPP) or a random propylene copolymer. However, it is preferred that the propylene matrix is a propylene homopolymer.

The polypropylene matrix being a propylene homopolymer has a rather low xylene cold soluble (XCS) content, i.e. of not more than 3.5 wt %, preferably of not more than 3.0 wt %, like not more than 2.6 wt %, based on the total weight of the polypropylene matrix. Thus, a preferred range is 0.5 to 3.0 wt %, based on the total weight of the propylene homopolymer (hPP).

The second component of the heterophasic propylene copolymer (HECO) is the elastomeric copolymer. As mentioned above the elastomeric copolymer is preferably an elastomeric propylene copolymer.

Preferably the elastomeric propylene copolymer comprises units derived from (i) propylene and (ii) ethylene and/or C4 to C20 α-olefins, preferably from (i) propylene and (ii) selected from the group consisting of ethylene, 1-butene, 1-hexene, and 1-octene. Preferably the propylene content in the elastomeric propylene copolymer is at least 40 wt %, more preferably at least 45 wt %. Thus in one preferred embodiment the elastomeric propylene copolymer comprises 40.0 to 85.0 wt %, more preferably 45.0 to 80 wt %, units derivable from propylene. The comonomers present in the elastomeric propylene copolymer are preferably ethylene and/or C4 to C20 α-olefins, like ethylene, 1-butene, 1-hexene and 1-octene. In one specific embodiment elastomeric propylene copolymer is a propylene-ethylene polymer. In one embodiment of the present invention, the elastomeric propylene copolymer is an ethylene propylene rubber (EPR) with the amounts given in this paragraph.

It is especially preferred that the heterophasic propylene copolymer (HECO) comprises a propylene homopolymer (hPP) as the polypropylene matrix and an ethylene propylene rubber (EPR) as the elastomeric propylene copolymer.

The share of the dispersed phase, which contains the elastomeric propylene copolymer, in the heterophasic propylene copolymer (HECO) is also indicated as xylene cold soluble (XCS) content of the heterophasic propylene copolymer (HECO). In other words, the terms "dispersed phase", "xylene cold soluble (XCS) content of the heterophasic propylene copolymer (HECO)", "elastomeric propylene copolymer" and "ethylene-propylene rubber (EPR)" denote the same, i.e. are interchangeable.

Preferably the xylene cold soluble content (XCS) of the heterophasic propylene copolymer (HECO) is >5.0 wt %, more preferably is in the range of 15 to 50 wt %, even more preferably is in the range of 20 to 40 wt %, like in the range of 25 to 35 wt %.

The intrinsic viscosity (IV) of the xylene cold soluble (XCS) fraction of the heterophasic propylene copolymer (HECO) is preferably moderate. Accordingly, it is appreciated that the intrinsic viscosity of the xylene cold soluble (XCS) fraction of the heterophasic propylene copolymer (HECO) is below 3.3 dl/g, more preferably below 3.1 dl/g, and most preferably below 3.0 dl/g. Even more preferred the intrinsic viscosity of the xylene cold soluble (XCS) fraction of the heterophasic propylene copolymer (HECO) is in the range of 1.5 to 3.3 dl/g, more preferably in the range 2.0 to 3.1 dl/g, still more preferably in the range of 2.2 to 3.0 dl/g.

The polypropylene base material (PBM) may comprise a nucleating agent, more preferably an alpha-nucleating agent, in amounts of for example up to 20.0 wt %, based on the total weight of the polypropylene composition.

Carbon Fibre (CF)

One essential component of the polypropylene composition according to the present invention is the carbon fibre (CF). It is appreciated that the carbon fibre (CF) imparts improved impact strength to the composition of the present invention.

The carbon fibre (CF) in the instant invention is present in the form of a roving and has an average fibre length in the range of 4.0 to 17.0 mm and the average particle length of the composition corresponds to the average fibre length of the carbon fibre (CF).

As commonly known in the art a roving is a bundle of fibres. Rovings are typically available in endless form, and so they are applied for producing the present polypropylene composition. The composition in a cross sectional view has a two layer core—sheath structure with the carbon fibre (CF) roving contained in the inner core which is surrounded by an outer layer of polypropylene base material (PBM). At the end of the production process of the present composition the obtained strands of the polypropylene composition are cut into specific lengths as is also the inner carbon fibre core. In this way the composition particles containing the carbon fibres (CF) of the same length as the particles as such are obtained.

In a preferred embodiment of the present invention the average fibre length of the carbon fibre (CF) is in the range of 7.0 to 16.0 mm and so the average particle length is. In an even more preferred embodiment the average fibre length of the carbon fibre (CF) (and so is the average particle length) is in the range of 10.0 to 15.0 mm.

In a preferred embodiment the fibre average diameter of the carbon fibre (CF) is in the range of 5 to 30 µm. More preferably, the carbon fibre (CF) has a fibre average diameter in the range of 5 to 25 µm and most preferably in the range of 5 to 20 µm.

The carbon fibre (CF) roving used in the present invention may comprise a sizing agent in order to improve its wetting and coupling to the polypropylene base material (PBM). Preferably, the carbon fibres (CF) comprise sizing agents on the surface of the fibres.

In one especially preferred embodiment, the carbon fibres (CF) comprise an epoxy-resin, more preferably a polyether modified epoxy resin, as sizing agent. A suitable sizing agent is for example Duroxy SEF 968w distributed by Cytec. Film formers, lubricants, stabilizers and antistatic agents may also be comprised in the sizing agent.

Usually the amount of such sizing agent is 15 wt % or less, more preferably 10 wt % or less, and most preferably 7.5 wt % or less, based on the total weight of the carbon fibres (CF). The surface treatment of the carbon fibre (CF) with a sizing agent can be done with known methods, like for example immersing the fibres in a tank in which a sizing agent is placed, being nipped and then drying in a hot-air oven, or with a hot roller or a hot plate. In one embodiment, the carbon fibre (CF) is treated by oxidation and/or carbonization, preferably oxidation and carbonization, before applying the sizing agent.

Adhesion Promoter (AP)

One essential component of the polypropylene composition according to the present invention is the adhesion promoter (AP). The adhesion promoter improves the compatibility between the polypropylene base material (PBM) and the carbon fibre (CF).

In a preferred embodiment the polypropylene composition of the present invention comprises 1.0 to 8.0 wt %, preferably 2.5 to 6.7 wt %, based on the total weight of the composition, of an adhesion promoter (AP).

The adhesion promoter (AP) preferably comprises a modified (functionalized) polymer and optionally a low molecular weight compound having reactive polar groups. Modified alpha-olefin polymers, in particular propylene homopolymers and random propylene copolymers, like copolymers of ethylene and propylene with each other or with other C4 to C12 alpha-olefins, are most preferred, as they are highly compatible with the polymer of the present composite. Modified polyethylene and modified styrene block copolymers, like modified poly(styrene-bbutadiene-b-styrene) (SBS) or poly(styrene-b-(ethylene-cobutylene)-b-styrene) (SEBS), can be used as well. The modified polymers are preferably selected from graft or block copolymers.

Preferred are modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

In a preferred embodiment the adhesion promoter (AP) is selected from the group of polypropylenes containing groups deriving from polar compounds which groups are selected from acid anhydrides, carboxylic acids, carboxylic acid derivatives, primary and secondary amines, hydroxyl compounds, oxazoline and epoxides. Specific examples of the said polar groups are unsaturated cyclic anhydrides and their aliphatic diesters and the diacid derivatives.

In particular, one can use maleic anhydride (MAH) and compounds selected from C1 to C10 linear and branched dialkyl maleates, C1 to C10 linear and branched dialkyl fumarates, itaconic anhydride, C1 to C10 linear and branched itaconic acid dialkyl esters, maleic acid, fumaric acid, itaconic acid and mixtures thereof.

In a specific example the adhesion promoter (AP) is a polypropylene containing groups deriving from polar compounds and is comprised in the polypropylene composition in an amount so as to obtain a content of groups deriving from polar compounds in the polypropylene composition, based on the total weight of the composition, in the range of 0.014 to 0.18 wt %, preferably in the range of 0.03 to 0.17 wt %, more preferably in the range of 0.05 to 0.15 wt %, like for example in the range of 0.07 to 0.1 wt %.

Especially preferred is a polypropylene composition wherein the adhesion promoter (AP) is a maleic anhydride (MAH) functionalized polypropylene with a content of maleic anhydride (MAH) ≥2 wt %.

Particular preference is given to an adhesion promoter (AP) being a polar modified propylene homopolymer. In another embodiment the adhesion promoter (AP) is a modified (random) propylene copolymer containing polar groups as defined above. In one embodiment, the polar modified polypropylene is a modified random propylene copolymer, wherein said random propylene copolymer comprises ethylene as the only comonomer unit. In one specific embodiment the adhesion promoter (AP) is a (random) propylene copolymer grafted with maleic anhydride (MAH).

Preferred values of the melt flow rate $MFR_2$ (190° C.; 2.1 kg) measured according to ISO 1133 for the adhesion promoter (AP) are in the range of 1.0 to 500.0 g/10 min, like in the range of 1.0 to 150.0 g/10 min. For example, the melt flow rate $MFR_2$ (190° C.; 2.1 kg) measured according to ISO 1133 for the adhesion promoter (AP) is from 10.0 to 100.0 g/10 min.

The adhesion promoter (AP) is known in the art and commercially available.

Additives, Colours and Nucleating Agents

As mentioned above the polypropylene composition further to the polypropylene base material (PBM), the carbon fibre (CF) and the adhesion promoter (AP) may contain typical additives and/or colours and/or alpha nucleating agents. Possible additives are those useful for instance in the automobile sector, like carbon black, other pigments, antioxidants, UV stabilizers, antistatic agents and slip agents. The additives and/or colours and/or alpha nucleating agents can be used in amounts usual in the art such as for example up to 20 wt %, based on the total weight of the polypropylene composition. It is appreciated that the overall sum of components (a) polypropylene base material (PBM), (b) carbon fibre (CF), (c) adhesion promoter (AP) and additives and/or colours and/or alpha nucleating agents is 100.0 wt %.

The nucleating agent is preferably part of the polypropylene base material (PBM). In a preferred embodiment the nucleating agent is an alpha-nucleating agent, e.g. a polymeric alpha-nucleating agent. The (alpha)-nucleating agent content, based on the total weight of the polypropylene composition, is for example up to 20.0 wt %, preferably up to 5.0 wt %. Possible alpha-nucleating agents are known in the art.

Process

The invention is also directed to a process for the preparation of the polypropylene composition of the present invention.

The above mentioned core sheath structure of the polypropylene composition of the instant invention is obtained by contacting an endless carbon fibre (CF) roving with the molten polypropylene base material (PBM) and the molten adhesion promoter (AP) in a continuous manner. The thus obtained strands of the polypropylene composition are solidified and cut into specific lengths in order to receive the particles of the polypropylene composition according to the present invention.

Accordingly the composition of the present invention is prepared by a process comprising the steps of
a) providing a polypropylene base material (PBM),
b) providing an adhesion promoter (AP),
c) melting the polypropylene base material (PBM) of step a) and melting the adhesion promoter (AP) of step b),
d) providing a carbon fibre (CF) in form of an endless roving,
e) combining the polypropylene base material (PBM) and the adhesion promoter (AP) of step c) with the carbon fibre (CF) of step d) such as to obtain a carbon fibre (CF) reinforced polypropylene material, f) solidifying and cutting the carbon fibre (CF) reinforced polypropylene material in particles with an average particle length in the range of 4.0 to 17.0 mm.

In a preferred embodiment, at least a part of the polypropylene base material (PBM) of step a) and at least a part or the whole amount of the adhesion promoter (AP) of step b) are melt compounded in step c) to form a pre-compound before they are combined with the carbon fibre (CF) in step e).

It is advantageous to do step e) that is the contacting of the polypropylene base material (PBM) and the adhesion promoter (AP) with the carbon fibre (CF) in two distinct steps in a pultrusion process: first the carbon fibre (CF) is impregnated with a first part of the polypropylene base material (PBM1) and with a part or the whole amount of the adhesion promoter (AP). Subsequently the so impregnated carbon fibre (CF) is coated with the remaining second part of the polypropylene base material (PBM2) and the remaining adhesion promoter (AP). The obtained carbon fibre (CF) reinforced polypropylene material is then further processed according to step f). Thus it is possible that only the inner carbon fibre (CF) containing core of the polypropylene composition contains the adhesion promoter (AP) or that both the inner carbon fibre (CF) containing core and the outer sheath of the polypropylene composition contain the adhesion promoter (AP).

In particular any pultrusion process well known and commonly used in the composite art such as for example described in EP1364760 can be used for step e) of the process according to the invention. For example a pultrusion process with a temperature profile between 140 and 210° C. is suitable. The pultrusion in process step e) has the advantage that the fibres in the obtained carbon fibre (CF) reinforced polypropylene material are typically arranged parallel. Preferably all fibres in the obtained particles obtained after solidifying and cutting in step f) are of the same length. The average particle length of the polypropylene composition corresponds to the average fibre length.

The average particle length of the particles obtained in process step f) is in the range of 4.0 to 17.0 mm. In a preferred embodiment the average particle length is in the range of 7.0 to 16.0 mm, in an even more preferred embodiment in the range of 10.0 to 15.0 mm. Accordingly, the average fibre length of the carbon fibre (CF) in the particles obtained by the process according to the invention is in the range of 4.0 to 17.0 mm, preferably of 7.0 to 16.0 mm and even more preferably in the range of 10.0 to 15.00 mm.

In order to obtain a composition having exceptional good impact strength, it is required that carbon fibre (CF) of step d) is provided in a continuous form, like in the shape of an endless roving. It is appreciated that the provision of the carbon fibre (CF) in the form of an endless roving has the advantage, that the particles obtained after solidifying and cutting in step f)—in a cross-sectional view—have a two layer structure, preferably a core sheath structure, where the inner layer is comprised of the carbon fiber (CF) being impregnated with the polypropylene base material (PBM).

Accordingly in a preferred embodiment step e) is done by first impregnating the carbon fibre (CF) of step d) with a first part of the polypropylene base material (PBM1) and with a part or the whole of the adhesion promoter (AP) of step c) and subsequently coating the thus impregnated carbon fibre (CF) with the remaining second part of the polypropylene base material (PBM2) and the remaining adhesion promoter (AP) of step c) such as to obtain a carbon fibre (CF) reinforced polypropylene material.

It is preferred that the impregnation of the carbon fibre (CF) is done with a first part of the polypropylene base material (PBM1) and with the whole amount of the adhesion promoter (AP), e.g. in the form of a mixture of both components.

Thus in an especially preferred embodiment the impregnation of the carbon fibre (CF) is done with a pre-compound obtained by melt compounding a first part of the polypropylene base material (PBM1) and at least a part or the whole amount of the adhesion promoter (AP) as mentioned above.

For the impregnation step the weight ratio of the first part of the polypropylene base material (PBM1) and the adhesion promoter (AP) can be in any desired range, such as for example in the range of 10:1 to 1:1 or in the range of 5:1 to 1:1 with a weight ratio of 1:1 being preferred.

For the coating step of the impregnated carbon fibres (CF) the remaining second part of the polypropylene base material (PBM2) and the adhesion promoter (AP) (in case that only a part of the adhesion promoter has been used for the impregnation) are used.

The weight ratio of the first part of the polypropylene base material (PBM1) used for impregnating the carbon fibre (CF) to the second part of the polypropylene base material (PBM2) used for coating the impregnated carbon fibre (CF) can be in the range of 1:1 to 1:30, preferably in the range of 1:3 to 1:25, most preferably in the range of 1:8 to 1:20.

In a preferred embodiment the first part of the polypropylene base material (PBM1) used for impregnating the carbon fibre (CF) comprises a polypropylene homopolymer (hPP).

Particular preference is given to an embodiment wherein a mixture e.g. a pre compound of the first part of the polypropylene base material (PBM1) and adhesion promoter (AP) with a weight ratio of 1:1 is used for the impregnation of the carbon fibre (CF), the first part of the polypropylene base material (PBM1) used for the impregnation comprises a propylene homopolymer (hPP) only and wherein the weight ratio of the first part of the polypropylene base material (PBM1) used for impregnating the carbon fibre (CF) to the second part of the polypropylene base material (PBM2) used for coating the impregnated carbon fibre (CF) is in the range of 1:8 to 1:20.

It is possible that the first part of the polypropylene base material (PBM1) used for impregnating the carbon fibre (CF) comprises the same polypropylene homopolymer (hPP) and/or the same polypropylene copolymer (cPP) as the second part of the polypropylene base material (PBM2) used for coating the impregnated carbon fibre (CF), hence that the same kind of polypropylene base material (PBM) is used both for impregnating and for coating the carbon fibre (CF). In this case the polypropylene base material (PBM) of the inventive polypropylene composition from composition point of view corresponds to the first and the second parts of the polypropylene base material (PBM1, PBM2) used in the pultrusion process.

However it is also possible that different kinds of polypropylene base materials (PBM) are used as the first part of the polypropylene base material (PBM1) for impregnating the carbon fibre (CF) and as the second part of the polypropylene base material (PBM2) for coating the impregnated carbon fibre (CF). For example the first and second parts of polypropylene base material (PBM1 and PBM2) may differ with regard to comprising a propylene homopolymer (hPP) and/or a propylene copolymer (cPP) or with regard to comprising different types of propylene homopolymer (hPP) and/or propylene copolymer (cPP). In this case the polypropylene base material of the inventive composition (PBM) from composition point of view is composed both of the first and the second parts of the polypropylene base materials (PBM1, PBM2) used in the pultrusion process.

In a preferred embodiment the same kind of polypropylene base material (PBM) comprising a propylene homopolymer (hPP) only is used both for impregnating (PBM1) the carbon fibre (CF) and for coating (PBM2) the impregnated carbon fibre (CF).

In a likewise preferred embodiment as the first part of the polypropylene base material (PBM1) there is used a polypropylene base material comprising a homopolymer (hPP) only for impregnation of the carbon fibre (CF) and as the second part of the polypropylene base material (PBM2) there is used a polypropylene base material comprising a heterophasic propylene copolymer (HECO) only for coating of the impregnated carbon fibre (CF).

Articles/Use

The invention is also directed to articles comprising the polypropylene composition according to the present invention.

The polypropylene composition of the invention is preferably used for the production of moulded articles, preferably injection moulded articles. One preferred way to produce the articles is that the particles obtained in step f) of the process according to the invention are subjected to a subsequent injection moulding step.

Accordingly there are articles preferred which are obtainable by subjecting the polypropylene composition according to the present invention to an injection moulding step.

The injection moulding step can be carried out by any injection moulding method well known and commonly used in the art, e.g. in an injection moulding machine. When subjecting the polypropylene composition of the invention to a moulding step, such as an injection moulding step, fibre attrition and fibre break up to a certain extent cannot be avoided. In order not to risk extensive (undesired) fibre attrition and fibre break the parameters and conditions of the injection moulding step shall be chosen carefully, meaning that the injection moulding step is to be performed in a way that is as gentle as possible. For example, the injection moulding step is carried out at a temperature between 170 and 250° C., preferably between 190 and 230° C. Moreover the backpressure during dosing should be as low as possible and the injection speed should not exceed a flow front speed in the cavity of 100 to 150 mm/s. A person skilled in the art perfectly knows how to set the parameters in the injection moulding step in order to minimize fibre attrition and fibre break. An extensive fibre attrition and fibre break would lead to articles no more showing the above mentioned advantages in the impact and stiffness properties which are linked to the inventive composition.

It is thus appreciated that the average fibre length of the carbon fibre (CF) in the obtained article after the (injection) moulding step may differ from, preferably may be smaller than, the average fibre length of the polypropylene composition of the invention. Accordingly there are articles preferred wherein the average fibre length of the carbon fibre (CF) comprised in the article is smaller or equal to the average fibre length of the carbon fibre (CF) comprised in the composition of the present invention. However the injection moulding step shall be targeted at obtaining articles with an average carbon fibre (CF) length being as little reduced as possible compared to the carbon fibre (CF) length in the polypropylene composition of the invention.

Thus the average fibre length of the carbon fibre (CF) comprised in the preferred articles is in the range of ≤4.0 to 17.0 mm. Within the meaning of the present invention carbon fibres (CF) of that length are called longer carbon fibres (CF). The fibre length in the final articles is measured by X-ray computed tomography (XCT) as will be explained below in the example section.

The polypropylene composition of the present invention is preferably used for the production of parts of washing machines or dishwashers as well as automotive articles, especially of car interiors and exteriors, like bumpers, side trims, step assists, body panels, spoilers, dashboards, interior trims and the like.

Especially preferred are articles being automotive articles.

The current invention also provides articles, like injection moulded articles, comprising at least 60 wt %, preferably at least 80 wt %, yet more preferably at least 95 wt %, like consisting of, the inventive polypropylene composition.

The articles comprising the polypropylene composition of the present invention show exceptional mechanical properties such as increased stiffness and strength and in particular excellent energy absorption i.e. impact strength and puncture energy at low density.

Thus the present invention is also directed to the use of the polypropylene composition for the production of articles having a tensile strength measured according to ISO527-2 of at least 150 MPa, a Charpy impact strength (notched) measured according to ISO179/1eA of at least 8 kJ/m$^2$ and an IPT puncture energy measured according to ISO 6603-2 of at least 5.5 J.

Those properties are mainly based on the longer carbon fibres (CF) comprised in the inventive polypropylene composition as they allow for production of (injection) moulded articles comprising longer carbon fibres (CF) as well. This will be shown in further detail in the experimental section below.

EXAMPLES

The following definitions of terms and determination methods apply for the above general description of the invention as well as to the below examples unless otherwise defined.

1. Measuring Methods

MFR$_2$ (230° C., 2.16 kg) is measured according to ISO 1133 (230° C., 2.16 kg load). For measuring the MFR$_2$ of the polymer matrix (PM) formed by components a) polypropylene base material (PBM) and c) adhesion promoter (AP) out of the carbon fibre (CF) containing polymer composition the sample preparation is done by using the method for determination of Hot Xylene Insoluble matter. Therefore the finely cut composition particles are subjected to an extraction in boiling xylene for several hours which enables separation of the insoluble matter that is the carbon fibre (CF) from the soluble matter that is the polymer matrix (PM) of the carbon fibre (CF) containing polymer composition. The polymer sample is placed in a pouch made of stainless steel net and dissolved in xylene under reflux conditions for 5 hours. The pouch containing the insoluble carbon fibre (CF) fraction is then taken out of the flask and the xylene is dried off at 100° C. from the soluble polymer matrix (PM) fraction. The polymer matrix is then prepared for MFR$_2$ (230° C., 2.16 kg) measurement according to ISO 1133.

MFR$_2$ (190° C., 2.1 kg) is measured according to ISO 1133 (190° C., 2.16 kg load).

Average fibre length of the carbon fibre (CF) and average fibre diameter: The average fibre length of the carbon fibre (CF) comprised in the polypropylene composition corresponds to the average particle length and is defined by the parameters in the final cutting step of the obtained strands in the pultrusion process. The average fibre length of the carbon fibre (CF) comprised in the articles produced from the composition is defined by the parameters and conditions in the (injection) moulding step.

The average carbon fibre (CF) length was determined by X-ray computed tomography (XCT). For the generation of XCT data a sub-μm CT nanotom (GE phoenix x-ray nanotom 180NF, Wunstorf, Germany) was used. The tube was operated at 70 kV to obtain enough contrast. The voxel size was $(2\ \mu m)^3$, the measured volume was $(5\times2\times3\ mm)^3$ of a sample of injection moulded specimen as described in EN ISO 1873-2 (dog bone shape, 4 mm thickness). The XCT data were processed by various algorithmic steps to ascertain the three-dimensional structure of the sample. The fibre length distribution was derived from the XCT data and the weighted mean average of the fibre length distribution was taken as the average fibre length.

The average carbon fibre (CF) diameter is determined according to ISO 1888:2006(E), Method B, microscope magnification of 1000. Pellets obtained from pultrusion were embedded in Struers CaldoFix resin under vacuum. For determining the average fibre diameter, the polished cross sections of these pellets were determined. Abrasion/polishing was performed on a Struers LaboPol-5 machine, employing grinding media with particle sizes down to 0.04 μm. The samples thus prepared were analyzed using an Olympus optical microscope in brightfield mode. The dimensions of the fibre cross-sections of the fibres in the matrix were measured to get the average fibre diameter (typically 20 around 30 individual fibers were measured and the shortest dimension of the fibre cross-section was used to get the fibre diameter).

Density of the polymer composition is measured according to ISO 1183-187. Sample preparation is done by compression moulding in accordance with ISO 1872-2:2007.

Xylene cold soluble (XCS, wt %) content: Content of xylene cold solubles (XCS) is determined at 25° C. according to ISO 16152; first edition; 2005-07-01

Melting temperature (Tm) is measured with a TA Instrument Q200 differential scanning calorimetry (DSC) on 5 to 7 mg samples. DSC is run according to ISO 11357-3/method C2 in a heat/cool/heat cycle with a scan rate of 10° C./min in the temperature range of −30 to +225° C. Melting temperature is determined from the second heating step.

Intrinsic viscosity is measured according to DIN ISO 1628/1, October 1999 (in Decalin at 135° C.).

Comonomer content/Quantification of microstructure by NMR spectroscopy Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)3) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950). With characteristic signals corresponding to 2, 1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed. The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to $$E=0.5(S_{\beta\beta\beta}+S_{\beta\gamma}+S_{\beta\delta}+0.5(S_{\alpha\beta}+S_{\alpha\gamma}))$$

Through the use of this set of sites the corresponding integral equation becomes:

$$E=0.5(I_H+I_G+0.5(I_c+I_D))$$

using the same notation used in the article of Wang et. al. (Wang, W-J., Zhu, S., Macromolecules 33 (2000), 1157). Equations used for absolute propylene content were not modified. The mole percent comonomer incorporation was calculated from the mole fraction:

E[mol %]=100*fEThe weight percent comonomer incorporation was calculated from the mole fraction:E [wt %]=100*(fE*28.06)/((fE*28.06)+((1-fE)*42.08))The comonomer sequence distribution at the triad level was determined using the analysis method of Kakugo et al. (Kakugo, M., Naito, Y., Mizunuma, K., Miyatake, T.Macromolecules 15 (1982) 1150). This method was chosen for its robust nature and integration regions slightly adjusted to increase applicability to a wider range of comonomer contents.

Tensile Modulus is measured according to ISO 527-2 (cross head speed=1 mm/min; 23° C.) using injection moulded specimens as described in EN ISO 1873-2 (1B dog bone shape, 4 mm thickness).

Tensile Strength is measured according to ISO 527-2 (cross head speed=50 mm/min; 23° C.) using injection moulded specimens as described in EN ISO 1873-2 (1B dog bone shape, 4 mm thickness).

Tensile strain at break is measured according to ISO 527-2 (cross head speed=50 mm/min; 23° C.) using injection moulded specimens as described in EN ISO 1873-2 (1B dog bone shape, 4 mm thickness).

Charpy notched Impact strength is determined according to ISO 179 1eA at 23° C. by using an 80×10×4 mm³ test bars injection molded in line with EN ISO 1873-2.

Charpy unnotched Impact strength is determined according to ISO 179 1eU at 23° C. by using injection moulded test specimens of 80×10×4 mm³ prepared in accordance with ENISO 19069-2.

IPT puncture energy is determined according to ISO 6603-2.

2. Examples 2.1. Comparative Examples

For comparative examples CE1 to CE6 6 fibre containing compositions were prepared using the components and amounts as indicated in Table 1 below and as explained further below. The carbon fibres were used in the form of a non-woven fabric. In all examples a co-rotational twin-screw extruder (ZSK 40 from Coperion) has been used. As side-feeder a Coperion ZSB40 twin screw side feeder has been used.

The following process parameters were used:
throughput of 100 kg/h
screw speed of 100-150 rpm
barrel temperatures of 250° C. flat
die plate with 5 mm holes, whereby 3 holes were opened In examples CE1 to CE3 a propylene homopolymer (PP Homo) was used, in examples CE4 to CE6 a heterophasic propylene copolymer was used which was composed of the propylene homopolymer (PP Homo) of CE1 to CE3 and an external rubber.

The propylene homopolymer (PP Homo), the adhesion promoter, the additives and for examples CE4 to CE6 the external rubber were fed to the extruder and melt-kneaded in the 4th barrel of the extruder which consists of three kneading blocks (two times a KB 45/5/40, followed by a KB 45/5/20 LH) and a left-handed conveying element. The non-woven fabric was added in the 6th barrel using a side feeder. A second kneading zone located in the 8th barrel and consisting of three kneading blocks (KB 45/5/20) was used to distribute the carbon fibres homogeneously.

Moreover, two TME elements (one TME 22.5/20 and one TME 22.5/20 LH) located between the 8th and the 9th barrel were used to further distribute the carbon fibres.

The following compositions (Table 1) for comparative examples CE1 to CE6 have been prepared.

TABLE 1

Polypropylene Compositions of comparative Examples CE1 to CE6

|  |  | PBM = Homo | | | PBM = Heco | | |
|---|---|---|---|---|---|---|---|
|  |  | CE1 | CE2 | CE3 | CE4 | CE5 | CE6 |
| PP Homo | wt % | 74.85 | 64.85 | 54.85 | 64.85 | 54.85 | 44.85 |
| External rubber | wt % | — | — | — | 10 | 10 | 10 |
| Adhesion promoter | wt % | 5 | 5 | 5 | 5 | 5 | 5 |
| Additives | wt % | 0.15 | 0.15 | 0.15 | 0.15 | 0.15 | 0.15 |
| Carbon fibres | wt % | 20 | 30 | 40 | 20 | 30 | 40 |

PP Homo is a propylene homopolymer having a density of 905 kg/m³, a melt flow rate (230° C., 2.16 kg, ISO 1133) of 20 g/10 min and a melting temperature of 167° C.

External rubber is a metallocene catalyzed, ethylene based octene copolymer having a density of 882 kg/m³ and a melt flow rate (190° C., 2.16 kg, ISO 1133) of 1.1 g/10 min.

Adhesion promoter is SCONA TSPP 10213 GB, a maleic anhydride (MAH) functionalized polypropylene distributed by BYK KOMETRA with a MFR (190° C., 2.16 kg, ISO 1133) of 200 g/10 min, a density of 0.89-0.92 g/cm³ and a MAH content of 2.0 wt %.

Carbon fibres are a non-woven fabric comprising at least 80 wt % of carbon fibres, produced by needle-punching. The average fibre diameter is 7 μm.

2.2 Inventive examples

For inventive examples IE1 to IE6 6 carbon fibre (CF) containing compositions were prepared using the components and amounts as indicated in Table 2 below and as explained further below. The carbon fibres (CF) were used in the form of an endless carbon fibre (CF) roving and the compositions were prepared in a pultrusion process using a first part of the polypropylene base material (PBM1) for impregnating the endless carbon fibre (CF) and the remaining second part (PBM2) for subsequent coating the impregnated carbon fibre (CF). The impregnation step was done with a pre-compound obtained by melt compounding the first part of the polypropylene base material (PBM1) and the whole amount of the adhesion promoter (AP) in a weight ratio of 1:1. The impregnating was carried out at a temperature not exceeding 210° C. After the coating step the obtained carbon fibre (CF) reinforced material was solidified and cut into particles with an average particle length of 10 mm (for IE1 to IE6), 7 mm (for IE1a) and 4 mm (for IE1b).

In examples IE1 to IE3, IE1a and IE1b a propylene homopolymer (PP Homo) was used as the only polymer of the polypropylene base material (PBM). Both for the impregnating step and the coating step there was used the same type of polypropylene base material (PBM, PP Homo).

In examples IE4 to IE6 the polypropylene base material (PBM) of the composition according to the invention comprised a propylene homopolymer (PP Homo) and a heterophasic propylene copolymer (PP Heco) with the PP Heco building the main component of the polypropylene base material (PBM). The first part of the polypropylene base material (PBM1) used for the impregnation step contained the PP Homo whereas the second part of the polypropylene base material (PBM2) used for the coating step contained the PP Heco.

The following compositions (Table 2) for inventive examples IE1 to IE6, IE1a and IE1b have been prepared.

TABLE 2

Polypropylene Compositions of inventive Examples IE1 to IE6, IE1a, IE1b

| | | PBM = Homo | | | PBM = Homo + Heco | | |
|---|---|---|---|---|---|---|---|
| | | IE1 IE1a IE1b | IE2 | IE3 | IE4 | IE5 | IE6 |
| Impregnation 50 wt % PP Homo HJ120UB, 50 wt % Adhesion promoter | wt % | 7.27 | 10.33 | 13.77 | 7.27 | 10.33 | 13.77 |
| Coating I PP Homo HJ120UB | wt % | 72.73 | 59.67 | 46.23 | — | — | — |
| Coating II PP Heco EE050AE | wt % | — | — | — | 72.73 | 59.67 | 46.23 |
| Carbon fibre (CF) roving | wt % | 20 | 30 | 40 | 20 | 30 | 40 |

PP Homo HJ120UB is a propylene homopolymer distributed by *Borealis* and containing heat stabilization and antistatic additives in an amount of 0.14 w %. This polymer has a density of 905 kg/m³ (ISO1183) and a MFR$_2$ of 75 g/10 min (230° C.; 2.16 kg; ISO 1133).

As Adhesion promoter SCONA TSPP 10213 GB, a maleic anhydride (MAH) functionalized polypropylene distributed by BYK KOMETRA with a MFR (190° C., 2.16 kg, ISO 1133) of 200 g/10 min, a density of 0.89-0.92 g/cm³ and a MAH content of 2.0 wt % was used.

PP Heco EE050AE is a reactor elastomer modified polypropylene distributed by *Borealis* having a density of 905 kg/m³, a melt flow rate (230° C., 2.16 kg, ISO 1133) of 11 g/10 min and an XCS content of 32.5 wt %.

A carbon fibre (CF) roving of the type GRAFIL 37-800WD 30K 1.0% R 6.80 KGS ML of company Mitsubishi Chemical Carbon Fiber and Composites, Inc was used.

2.3 Properties of comparative and inventive examples

In order to test the mechanical properties of the polypropylene compositions test specimens were produced from the composition particles of comparative examples CE1 to CE6 and inventive examples IE1 to IE6 by subjecting the compositions to an injection moulding process carried out on a Engel EVC310/120 injection moulding machine at a melt temperature of 250° C., a back pressure of 1 bar hydraulic and a flow front speed in the cavity of 125 mm/s.

Properties of the compositions are shown in below Table 3 for the compositions with a polypropylene base material (PBM) comprising a PP Homo only and in Table 4 for the compositions with a polypropylene base material (PBM) comprising (additionally) a PP Heco.

TABLE 3

Properties of comparative examples CE1 to CE3 and inventive examples IE1 to IE3

| | | PBM = Homo | | | | | |
|---|---|---|---|---|---|---|---|
| | | CE1 | CE2 | CE3 | IE1 | IE2 | IE3 |
| Carbon fibre (CF) | wt % | 20 | 30 | 40 | 20 | 30 | 40 |
| Polymer matrix MFR$_2$ | g/10 mm | 24.4 | 25.1 | 26.1 | 83.6 | 89.4 | 98.6 |
| average fibre length in pellets | mm | <1.5 | <1.5 | <1.5 | 10 | 10 | 10 |
| Density | kg/m³ | 990 | 1060 | 1130 | 990 | 1060 | 1130 |
| Tensile modulus | MPa | 10500 | 15600 | 19800 | 13848 | 19122 | 23550 |
| Tensile strength | MPa | 120 | 135 | 138 | 180 | 207 | 217 |
| Tensile strain at break | % | 1.80 | 1.20 | 1.00 | 1.46 | 1.25 | 1.09 |
| Charpy notched impact strength | kJ/m² | 5.0 | 4.6 | 4.4 | 16.1 | 17.1 | 20.2 |
| Charpy unnotched impact strength | kJ/m² | 30.0 | 26.0 | 21.0 | 34.7 | 39.2 | 38.9 |
| IPT Puncture energy | J | 5 | 5.1 | 5.3 | 7.78 | 8.91 | 13.9 |

TABLE 4

Properties of comparative examples CE4 to CE6 and inventive examples IE4 to IE6

| | | PBM = Heco | | | PBM = Homo + Heco | | |
|---|---|---|---|---|---|---|---|
| | | CE4 | CE5 | CE6 | IE4 | IE5 | IE6 |
| Carbon fibre (CF) | wt % | 20 | 30 | 40 | 20 | 30 | 40 |
| Polymer matrix MFR$_2$ | g/10 mm | 18.8 | 18.6 | 18.4 | 14.6 | 17.4 | 22.5 |
| average fibre length in pellets | mm | <1.5 | <1.5 | <1.5 | 10 | 10 | 10 |
| Density | kg/m³ | 990 | 1060 | 1130 | 990 | 1060 | 1130 |
| Tensile modulus | MPa | 10565 | 14587 | 17922 | 13242 | 17126 | 21195 |
| Tensile strength | MPa | 99 | 113 | 117 | 161 | 176 | 188 |
| Tensile strain at break | % | 3.06 | 2.27 | 1.78 | 1.54 | 1.35 | 1.19 |
| Charpy notched impact strength | kJ/m² | 6.0 | 5.0 | 5.0 | 17.9 | 21.0 | 21.0 |
| Charpy unnotched impact strength | kJ/m² | 26.0 | 17.0 | 13.0 | 34.3 | 36.6 | 36.9 |
| IPT Puncture energy | J | 4.07 | 4.10 | 4.36 | 10.75 | 14.98 | 19.15 |

As explained above the polymer matrix MFR$_2$ mentioned in Tables 3 and 4 is the MFR$_2$ of the polymer matrix (PM)

formed by components a) polypropylene base material (PBM) and c) adhesion promoter (AP) of the composition.

As can be seen from Tables 3 and 4 the Tensile modulus and Tensile strength improve with increasing carbon fibre content (20 to 40 wt % for CE1 to CE3, IE1 to IE3, CE4 to CE6, IE4 to IE6) of the compositions. This trend is visible both for the comparative and for the inventive compositions. However it is evident that for the compositions according to the invention (IE1 to IE3, IE4 to IE6) the absolute values of the Tensile modulus and the Tensile strength are much better than the ones for the comparative compositions (CE1 to CE3, CE4 to CE6) with the same carbon fibre (CF) content. Hence the higher carbon fibre length (and particle length) in the inventive examples have a positive impact on the Tensile modulus and the Tensile strength.

A yet clearer picture is obtained when comparing the impact properties: for the inventive compositions the absolute values for the Charpy notched and unnotched impact strength are clearly higher than for the comparative compositions with the same carbon fibre (CF) content, which have been produced by adding the fibres as a non-woven fabric in an extruder and where the fibre length in the obtained pellets is <1.5 mm with the fibres being randomly distributed: for the inventive compositions the charpy notched values are up to 3 times (CE1-IE1; CE4-IE4) or even more than 4 times (CE3-IE3; CE6-IE6) as high as for the comparative compositions; charpy unnotched values are up to 1.5 times (CE2-IE2; CE3-IE3) or more than 2 times (CE5-IE5) or even more than 2.5 times (CE6-IE6) as high as for the comparative examples.

Moreover for the comparative examples both the Charpy notched and unnotched impact strengths are decreasing with increasing carbon fibre (CF) content. This is a disadvantage especially because the tensile properties show an opposing trend with increasing carbon fibre (CF) content. Thus with the comparative compositions it is not possible to achieve a satisfying tensile/impact balance (CE1 to CE6 in Tables 3 and 4).

In contrast to that, the inventive compositions (IE1 to IE6 in Tables 3 and 4) show both increasing or at least stable Charpy notched and unnotched impact strengths with increasing carbon fibre (CF) content. Here the trend is in the same direction as the tensile properties so that with the compositions according to the invention an excellent tensile/impact performance is achievable.

The IPT Puncture energy too shows remarkably increased values for the inventive compositions over the comparative compositions with the same carbon fibre (CF) content: for IE1 and IE2 the values are more than 50%, for IE3 yet more than 150% increased over CE1, CE2, respectively CE3. For IE4 the IPT value is more than twice as high, for IE5 more than 3 times and for IE6 yet more than 4 times as high as for CE4, CE5, respectively CE6.

Moreover it can be seen from Tables 3 and 4 that IPT Puncture energy can be considerably improved by increasing the carbon fibre (CF) content of the inventive compositions: Puncture energy increases of 56% (IE2-IE3) or of 39% (IE4-IE5) can be obtained. For the comparative examples increases of only up to 6% (CE5-CE6) are observed. This trend additionally contributes to the excellent tensile/impact performance of the compositions according to the present invention.

Below Table 5 shows the properties of the inventive composition prepared for IE1 and containing 20 wt % carbon fibres (CF) as explained above depending on the carbon fibre (CF) length (hence the particle length). Carbon fibre (CF) lengths of 4 mm, 7 mm and 10 mm are compared.

TABLE 5 comparison of inventive examples IE1a, IE1b and IE1 - comparison of fibre lengths 4 mm/7 mm/10 mm

|  |  | IE1a | IE1b | IE1 |
|---|---|---|---|---|
| average fibre length in pellets | mm | 4 | 7 | 10 |
| Tensile modulus | MPa | 14431 | 14288 | 13848 |
| Tensile strength | MPa | 194 | 187 | 180 |
| Tensile strain at break | % | 1.55 | 1.48 | 1.46 |
| Charpy notched impact strength | kJ/m$^2$ | 11.6 | 12.2 | 16.1 |
| Charpy unnotched impact strength | kJ/m$^2$ | 33.5 | 31.2 | 34.7 |
| IPT Puncture energy | J | 6.05 | 6.8 | 7.78 |

As can be seen from Table 5 the impact properties, the tensile modulus and the tensile strength of all tested inventive compositions having different carbon fibre (CF) lengths within the claimed range show considerably better values than for the corresponding comparative example CE1 with a fibre length of <1.5 mm.

The invention claimed is:
1. A polypropylene composition comprising:
   a. 37.0 to 95.0 wt %, based on a total weight of the polypropylene composition, of a polypropylene base material (PBM), wherein the polypropylene base material (PBM) comprises a propylene homopolymer (hPP) and a heterophasic propylene copolymer (HECO) in a weight ratio of propylene homopolymer (hPP) to heterophasic propylene copolymer (HECO) in a range of 1:5 to 1:25; and
   b. 4.5 to 50.0 wt %, based on the total weight of the polypropylene composition, of a carbon fiber (CF); and
   c. 0.5 to 13.0 wt %, based on the total weight of the polypropylene composition, of an adhesion promoter (AP),
   wherein the carbon fiber (CF) comprised in the polypropylene composition is a roving and has an average fiber length in a range of 4.0 to 17.0 mm, the polypropylene composition is present as particles with the components a) and c) forming a polymer matrix (PM) having a melt flow rate MFR$_2$ (230° C., 2.16 kg) measured according to ISO 1133 in a range of 2.0 to 250 g/10 min and wherein an average particle length of the polypropylene composition corresponds to an average fiber length of the carbon fiber (CF), and wherein
   the propylene homopolymer (hPP) has
   a1. a melting temperature measured according to ISO 11357-3 of at least 150° C. and/or
   b1. a xylene cold soluble (XCS) content of 4.0 wt %, based on a total weight of the propylene homopolymer (hPP),
   the heterophasic propylene copolymer (HECO) has
   a2. a xylene cold soluble (XCS) content of >5.0 wt %, based on a total weight of the heterophasic propylene copolymer (HECO), and/or
   b2. a comonomer content of ≤30.0 mol %, based on a total weight of the heterophasic propylene copolymer (HECO), and
   wherein the polypropylene base material (PBM) and the adhesion promoter (AP) are the only polymeric compounds in the polypropylene composition.

2. The polypropylene composition according to claim 1, wherein the average fiber length of the carbon fiber (CF) is in a range of 7.0 to 16.0 mm.

3. The polypropylene composition according to claim 1, wherein a fiber average diameter of the carbon fiber (CF) is in a range of 5 to 30 μm.

4. The polypropylene composition according to claim 1, wherein the polypropylene composition comprises 1.0 to 8.0 wt %, based on the total weight of the polypropylene composition, of an adhesion promoter (AP).

5. The polypropylene composition according to claim 1, wherein the adhesion promoter (AP) is a polypropylene containing a group derived from a polar compound selected from the group consisting of acid anhydride, carboxylic acid, carboxylic acid derivative, primary and secondary amine, hydroxyl, oxazoline and epoxide.

6. The polypropylene composition according to claim 1, wherein the adhesion promoter (AP) is a maleic anhydride functionalized polypropylene.

7. An article comprising the polypropylene composition according to claim 1.

8. The article according to claim 7, wherein the article is an injection molded article.

9. The article according to claim 7, wherein the average fiber length of the carbon fiber (CF) comprised in the article is smaller or equal to the average fiber length of the carbon fiber (CF) comprised in the polypropylene composition.

10. A process for the preparation of a polypropylene composition according to claim 1, comprising the steps of:
a. providing a polypropylene base material (PBM),
b. providing an adhesion promoter (AP),
c. melting the polypropylene base material (PBM) of step a) and melting the adhesion promoter (AP) of step b),
d. providing a carbon fiber (CF) as a continuous roving,
e. combining the polypropylene base material (PBM) and the adhesion promoter (AP) of step c) with the carbon fiber (CF) of step d) to obtain a carbon fiber (CF) reinforced polypropylene material, and
f. solidifying and cutting the carbon fiber (CF) reinforced polypropylene material into particles with an average particle length in a range of 4.0 to 17.0 mm to obtain the polypropylene composition.

11. The process according to claim 10, wherein comprising melt compounding at least a part of the polypropylene base material (PBM) of step a) and at least a part or a whole amount of the adhesion promoter (AP) of step b) in step c) to form a pre-compound, and combining the pre-compound with the carbon fiber (CF) in step e).

12. The process according to claim 10, comprising carrying out step e) by first impregnating the carbon fiber (CF) of step d) with a first part of the polypropylene base material (PBM1) and with a part or a whole of the adhesion promoter (AP) of step c) and subsequently coating a thus impregnated carbon fiber (CF) with a remaining second part of the polypropylene base material (PBM2) and any remaining adhesion promoter (AP) of step c) to obtain a carbon fiber (CF) reinforced polypropylene material.

13. A process for the preparation of a polypropylene composition comprising:
a. 37.0 to 95.0 wt %, based on a total weight of the polypropylene composition, of a polypropylene base material (PBM) wherein the polypropylene base material (PBM) is:
  i. a propylene homopolymer (hPP) and/or
  ii. a propylene copolymer (cPP); and
b. 4.5 to 50.0 wt %, based on the total weight of the polypropylene composition, of a carbon fiber (CF); and
c. 0.5 to 13.0 wt %, based on the total weight of the polypropylene composition, of an adhesion promoter (AP),
wherein the carbon fiber (CF) comprised in the polypropylene composition is a roving and has an average fiber length in a range of 4.0 to 17.0 mm, the polypropylene composition is present as particles with the components a) and c) forming a polymer matrix (PM) having a melt flow rate $MFR_2$ (230° C., 2.16 kg) measured according to ISO 1133 in a range of 2.0 to 250 g/10 min and wherein an average particle length of the polypropylene composition corresponds to an average fiber length of the carbon fiber (CF), and wherein
the propylene homopolymer (hPP) has
a1. a melting temperature measured according to ISO 11357-3 of at least 150° C. and/or
b1. a xylene cold soluble (XCS) content of ≤4.0 wt %, based on a total weight of the propylene homopolymer (hPP),
the propylene copolymer (cPP) is a heterophasic propylene copolymer (HECO) having
a2. a xylene cold soluble (XCS) content of >5.0 wt %, based on a total weight of the heterophasic propylene copolymer (HECO), and/or
b2. a comonomer content of ≤30.0 mol %, based on a total weight of the heterophasic propylene copolymer (HECO), and
wherein the polypropylene base material (PBM) and the adhesion promoter (AP) are the only polymeric compounds in the polypropylene composition,
the process comprising steps of:
a'. providing a polypropylene base material (PBM),
b'. providing an adhesion promoter (AP),
c'. melting the polypropylene base material (PBM) of step a) and melting the adhesion promoter (AP) of step b),
d'. providing a carbon fiber (CF) as a continuous roving,
e'. impregnating the carbon fiber (CF) of step d') with a first part of the polypropylene base material (PBM1) and with a whole of the adhesion promoter (AP) of step c') and subsequently coating a thus impregnated carbon fiber (CF) with a remaining second part of the polypropylene base material (PBM2) to obtain a carbon fiber (CF) reinforced polypropylene material, and
f'. solidifying and cutting the carbon fiber (CF) reinforced polypropylene material into particles with an average particle length in a range of 4.0 to 17.0 mm to obtain the polypropylene composition.

* * * * *

UNITED STATES PATENT AND TRADEMARK OFFICE
CERTIFICATE OF CORRECTION

| | |
|---|---|
| PATENT NO. | : 11,530,320 B2 |
| APPLICATION NO. | : 16/630254 |
| DATED | : December 20, 2022 |
| INVENTOR(S) | : Lummerstorfer et al. |

It is certified that error appears in the above-identified patent and that said Letters Patent is hereby corrected as shown below:

On the Title Page

Item (72) Inventor: delete "Michael Tranninger, Linz (AT)"
Insert --Michael Tranninger, Kematen an der Krems (AT)--

Signed and Sealed this
Fifth Day of September, 2023

Katherine Kelly Vidal
*Director of the United States Patent and Trademark Office*